United States Patent [19]

Jamison

[11] Patent Number: 4,517,803
[45] Date of Patent: May 21, 1985

[54] TURBOCHARGER COMPRESSOR VALVE

[75] Inventor: Terry Jamison, Hermosa Beach, Calif.

[73] Assignee: The Garrett Corporation, Los Angeles, Calif.

[21] Appl. No.: 487,623

[22] Filed: Apr. 22, 1983

[51] Int. Cl.³ ............................................. F02B 37/12
[52] U.S. Cl. ...................................... 60/611; 137/859
[58] Field of Search .................... 60/611, 600, 601; 123/564; 137/859

[56]         References Cited
U.S. PATENT DOCUMENTS

| | | | |
|---|---|---|---|
| 2,635,630 | 4/1953 | Cornelius | 137/859 |
| 3,032,060 | 5/1962 | Huffman | 137/859 X |
| 3,270,951 | 9/1966 | Reed | 251/28 X |
| 3,324,651 | 6/1967 | Smith et al. | |
| 3,363,412 | 1/1968 | Fischer et al. | |
| 3,651,636 | 3/1972 | Glassey et al. | |
| 4,120,156 | 10/1978 | McInerney | 60/602 |
| 4,183,216 | 1/1980 | Tanaka et al. | |
| 4,202,176 | 5/1980 | Mezger | 60/600 |
| 4,222,240 | 9/1980 | Castellano | |
| 4,304,097 | 12/1981 | Kondo et al. | 60/602 |
| 4,350,135 | 9/1982 | Casey et al. | 418/138 X |

FOREIGN PATENT DOCUMENTS

| | | | |
|---|---|---|---|
| 531243 | 10/1956 | Canada | 137/859 |
| 2435707 | 2/1976 | Fed. Rep. of Germany . | |
| 2441804 | 3/1976 | Fed. Rep. of Germany . | |
| 450925 | 12/1975 | U.S.S.R. | 137/859 |

Primary Examiner—Michael Koczo
Assistant Examiner—Randolph A. Smith
Attorney, Agent, or Firm—James W. McFarland; Albert J. Miller

[57] ABSTRACT

A turbocharger, supercharger or like apparatus for delivering pressurized airflow to an engine, with a housing and valve structure associated with the compressor for permitting selective recirculating flow from the high pressure compressor exhaust to the inlet thereof. A diaphragm acts both as the valve and to define a signal chamber.

13 Claims, 4 Drawing Figures

TURBOCHARGER COMPRESSOR VALVE

BACKGROUND OF THE INVENTION

This invention relates to turbochargers or like apparatus for delivering pressurized airflow to an engine, and relates more particularly to an improved valve and housing structure and method associated therewith for selectively permitting recirculating fluid flow from the compressor outlet to the low pressure inlet of the compressor.

A variety of prior art references illustrate various occasional needs for a valve associated with the turbocharger for relieving pressurized airflow from the compressor discharge prior to its delivery to the manifold of the engine. An important consideration for such a control in a turbocharger is economical and compact configuration and construction. It is also important that such a valve and its associated structure have a universality of design since it may be readily incorporated into a variety of turbochargers, and may even be retrofit onto existing turbochargers in certain applications. Such important considerations become doubly difficult when the desired control valve is pressure actuated, and particularly so if it is desired that the valve operate from a subatmospheric pressure control signal, such as when the valve operates to assist in emissions control by promoting exhaust gas recirculation in certain situations by reducing the discharge pressure and thus engine intake manifold pressure by permitting recirculating fluid flow from the compressor exhaust directly back to the inlet thereof.

SUMMARY OF THE INVENTION

Accordingly, it is an important object of the present invention to provide a turbocharger or supercharger apparatus and method having an economical, compact valve for use in permitting selective recirculating fluid flow around the compressor.

Another more particular object is to provide such a valve structure and method which is operable pneumatically by a remote, subatmospheric pressure signal.

Another object of the present invention is to provide a valve of the kind described in a turbocharger, wherein the valve is integrally mounted to the compressor housing for economical, compact configuration.

Another important object of the present invention is to provide in a turbocharger method and apparatus of the type aforementioned, a valve which utilizes a diaphragm both for a sealing function as well as a valving function in order to promote the compactness and economy of design. In association with this, the present invention also contemplates an arrangement which permits relative motions and relationships whereby the criticality of tight dimensional tolerances are minimized.

In summary, one form of the invention contemplates a valve structure and method including both an adapter and a cover housing separately mounted in sequential relationship upon the inlet end face of a compressor housing for a turbocharger or supercharger. A diaphragm is utilized to both seal and define a pressure signal chamber as well as to act directly upon a planar end face of the compressor housing to valve fluid flow from the compressor discharge passage to the inlet passage. The diaphragm is preferably urged onto the planar end surface by a spring acting through a spring retainer which is axially guided within a cylindrical wall in the cover housing. The biasing spring exerts a biasing force through the retainer and onto a backing piston associated with the diaphragm. The spring retainer and backing piston are separately movable, and the backing piston has a circular rib thereon to limit transverse excursional movements of the diaphragm and backing piston. Thus, the axial guidance provided by the spring retainer, along with the limitation on transverse excursional movement provided by the rib on the backing piston, effectively control and guide the entire valve in an economical fashion minimizing close tolerances and facilitating assemblage.

These and other more particular objects and advantages of the present are specifically set forth in or will become apparent from the following detailed description of a preferred embodiment of the invention, when read in conjunction with the accompanying drawings.

DETAILED DESCRIPTION OF THE PREFERRED EMBODIMENT

Figure 1:
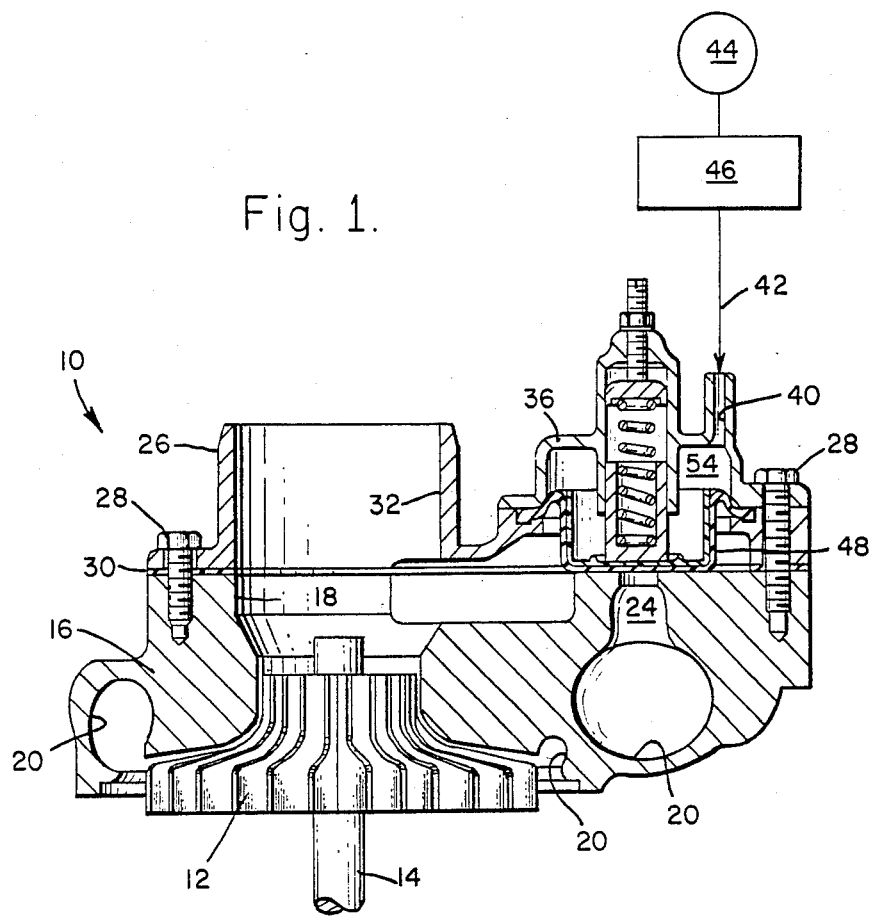
FIG. 1 is a longitudinal cross-sectional view of a portion of a turbocharger incorporating the present invention along with a schematically illustrated control system therefor.
Figure 2:
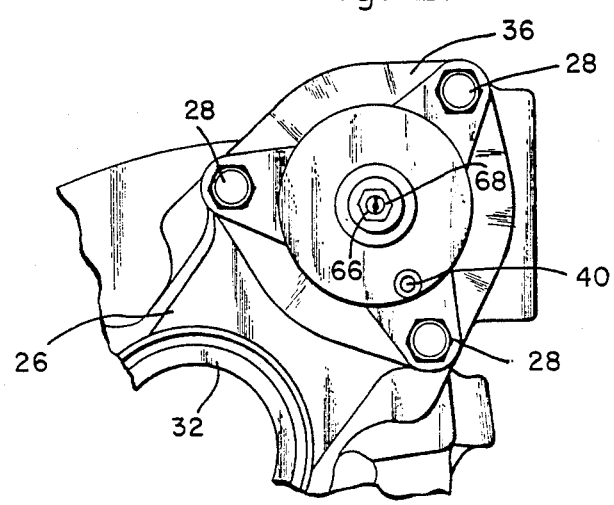
FIG. 2 is a fragmentary, planar top end view of the structure illustrated in FIG. 1.
Figure 3:
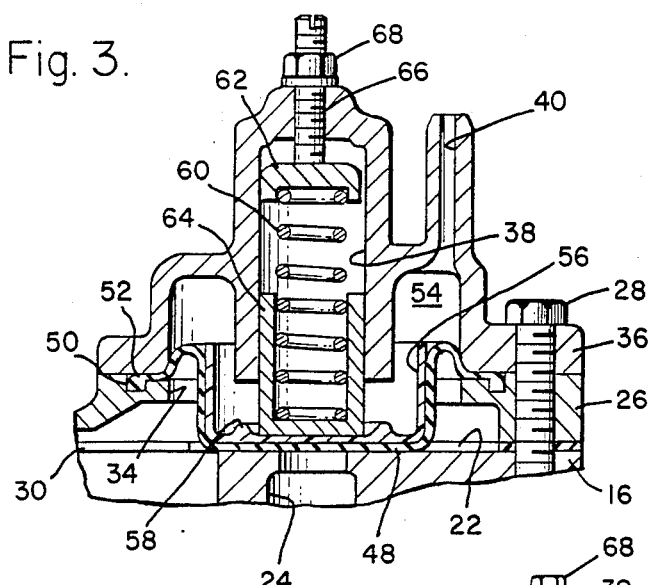
FIG. 3 is an enlarged cross-sectional view of the valve portion illustrated in FIG. 1.

Referring now more particularly to the drawings, a turbocharger generally designated by the numeral 10 includes a turbocharger housing of which three portions are illustrated: a compressor housing 16, adapter housing 26, and cover housing 36. A compressor 12 rotatably mounted on a shaft 14 is carried within compressor housing 16. It will be understood that generally the turbocharger further includes a turbine, and additional housing and apparatus, (not shown) for driving the illustrated compressor. The invention is equally applicable to other arrangements for providing pressurized air to the inlet of an engine, such as a supercharger wherein the compressor 12 would be mechanically driven by the engine itself. Compressor housing 16 includes a low pressure cavity or inlet passage 18 leading to the inlet side of the compressor, as well as scroll configured discharge passage 20. Housing 16 also includes an interconnection duct or opening 24 communicating with the discharge duct 20 at a location therein carrying relatively high pressure discharge flow from the compressor. Inlet passage 18 and interconnection duct 24 open onto a planar surface 22 at the inlet side of housing 16 at locations spaced transversely from one another.

Mounted at planar surface 22 is adapter housing 26 which is rigidly secured to compressor housing 16 by a plurality of bolts 28 with an appropriate gasket or seal 30 sandwiched between the two housings. Adapter housing 26 includes an axially extending, upstanding boss portion for defining an axially extending airflow inlet port 32 which aligns with and directs atmospheric inlet flow to inlet passage 18 of the compressor housing. The adapter housing also includes a recessed opening overlying the inner connection duct 24, as well as a through opening or passage 34 axially aligned with interconnection duct 24.

Mounted atop adapter housing 26 in overlying relationship to the opening 34 is cover housing 36. Three bolts 28 secure cover housing 36 to adapter housing 26 as illustrated. In contrast to the sealing arrangement between the adapter and compressor housings, it important to note that no gasket or separate sealing member is utilized between the cover housing 36 and adapter housing 26. Cover housing 36 includes a centrally located internal cylindrical wall 38, as well as a relatively small upstanding boss defining a pressure signal port 40. Optionally, the cover housing may have an opening 39 therein to permit external adjustment of the pressure opening setting for the valve as described in greater detail below.

As illustrated in FIG. 1 the signal port 40 is arranged and configured to receive a pressure signal via duct 42 from an associated pressure signal source 44. Also schematically illustrated in FIG. 1 is a control 46 for regulating the pressure signal delivered to signal port 40 and the interior of adapter housing 36. Preferably, source 44 is a negative pressure or vacuum source which generates subatmospheric within the interior of cover housing 36. This permits the invention to operate to promote exhaust gas recirculation for promotion of emissions control by reducing engine intake manifold pressure. The particular control, whether vacuum operated or otherwise, is illustrated herein merely for purposes of discussion, it being noted that the present invention is useful in a variety of applications regardless of the type of pressure signal delivered to signal port 40. Accordingly, a detailed discussion of the control is unnecessary to the understanding of the present invention.

A flexible, elastomeric, circularly configured diaphragm 48 is mounted between the adapter housing 26 and cover housing 36 in general alignment with interconnection duct 24. Diaphragm 48 includes a continuous, peripheral edge and enlarged bead 52 which snugly fits within a circular groove 50 in the adapter housing. The other edge portion and bead 52 of the diaphragm effectively provide the sealing between the mating surfaces of the cover housing 36 and adapter housing 26. In this manner it can be seen that the diaphragm 48 performs a conventional function for diaphragm operated valves inasmuch as the diaphragm 48 sealingly traverses across the opening 34 thereby dividing the interior cavities of the adapter and cover housings into one subcavity below the diaphragm which can communicate with the compressor discharge passage 20 and interconnection duct 24, and a second subcavity on the opposite, upper side of diaphragm 48 sealing from the first subcavity. The diaphragm 48 therefore operates with the adapter housing and cover housing to form a sealed internal pressure signal chamber 54 within the interior cover housing 36 to which the signal port 40 leads.

Disposed within internal pressure signal chamber 54 of cover housing 36 is a relatively rigid backing piston 56 preferably constructed of plastic material, providing rigidity for the elastomeric diaphragm 48. Formed or molded on the upper surface of backing piston 56 is a circular upstanding rib 58. Biasing means in the form a spring 60 is provided within the cylindrical wall 38 acting between an upper stop 62 and lower spring retainer 64. To allow for external adjustment of compression of spring 60, the stop 62 may incorporate a threaded segment 66 extending outwardly through threaded opening 39 such that threaded segment 66 and an external locking nut 68 afford adjustment of the axial position of stop 62 and thus the compression of spring 60. The lower retainer 64 is cylindrically configured to slide inside wall 38 and to be axially guided therewithin. The retainer 64 may incorporate flats (not shown) on its side walls or a central hole through one end (not shown) to promote direct fluid communication between the interior if cylindrical wall 38 and the remainder of internal pressure signal chamber 54. The bottom surface of retainer 64 comprises a flat surface directly contacting backing piston 56 and fitting within the circular rib 58 such that the rib 58 limits transverse excursional movement of the diaphragm 48 and backing piston 56. Yet, retainer 64 and backing piston 56 are not intersecured. With the limited transverse excursional movement permitted between the retainer and backing piston, as well as the axial guiding action provided by cylindrical wall 38, it will be seen that the entire assemblage inside cover housing 36 is retained in proper alignment while still presenting an extremely economical and compact design.

Figure 4:
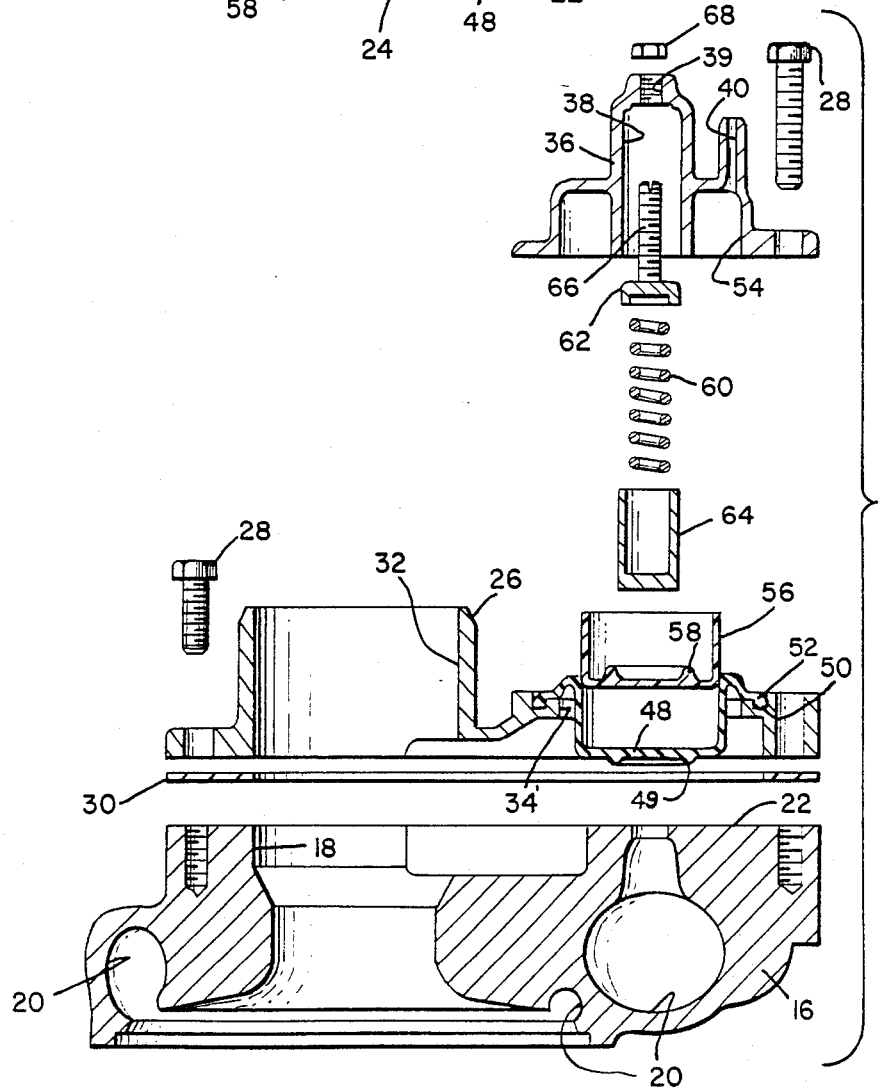
FIG. 4 is an exploded cross-sectional view of the housing and associated structure with the compressor removed.

The overall structure of the present invention presents an assembly of compact, economical construction which is readily assembled and may even be mounted in retrofit manner to preexisting turbocharger housings. More particularly, as depicted in FIG. 4 the arrangement is readily assembled by fitting the diaphragm bead 52 into the associated groove 50, placing the backing piston 56 on the diaphragm and then placing the spring 60, associated stop 62, and retainer 64 in position within the cover housing. Upon subsequent fastening of the cover housing to the adapter housing 26 by tightening of bolts 28 associated therewith, the entire valve assemblage is secured in proper alignment and position for subsequent operation. As necessary, the threaded segment 66 and the locking nut 68 may be adjusted to develop the desired precompression of spring 60.

In operation, rotation of compressor 14 causes ambient inlet airflow delivered through inlet port 32 and passage 18 to be compressed and delivered in a high pressure stage through the scroll configured discharge passage 20. In a conventional manner not illustrated, the compressor discharge flow in discharge passage 20 is delivered to the intake manifold of an engine. Spring 60 acting through retainer 64 and backing piston 56 normally urges diaphragm 48 into sealing engagement with planar surface 24 to interrupt fluid flow through interconnection duct 24. Thus diaphragm 48, in addition to performing its normal conventional function of sealing the internal pressure chamber 54, also operates directly as the valve element for controlling fluid flow through interconnection duct 24. To further promote interruption of fluid flow through the interconnection duct 24, diaphragm 48 includes a circular bead 49, shown in FIG. 4, for sealingly contacting surface 22.

The lower surface of diaphragm 48 is subjected to a relatively high pressure in the central portion thereof due to its direct exposure to interconnection duct 24. Surrounding this central portion, an annular circumferential ring-like portion of the lower surface of diaphragm 48 is subjected to the atmospheric or slightly sub-atmospheric inlet pressure in inlet 18 by virtue of the communication between opening 34, inlet port 32, and inlet passage 18. On the opposite side of the diaphragm, the relatively low subatmospheric or vacuum signal pressure existing in chamber 54 opposes the higher pressure on the opposite side. The force of spring 60 also, of course, opposes the forces on the lower surfaces of diaphragm 48.

Accordingly, upon developing a sufficiently low subatmospheric pressure in chamber 54, the forces exerted on the lower side of diaphragm 48 are sufficient to overcome the opposing spring force and shift diaphragm 48 upwardly to permit recirculating fluid flow from discharge passage 20 through interconnection duct 24 to the inlet of the compressor housing. Dependent upon the nature of the signal pressure delivered to internal chamber 54, the diaphragm valve may operate either to modulate or variably meter fluid flow through interconnection duct 24 in a desired manner, or merely move between fully opened and fully closed positions. When the diaphragm 48 moves to its open position, of course, the short-circuiting of high pressure flow through the interconnection duct effectively reduces pressure in the discharge passage 20 and the intake manifold of the engine for the desired control purposes.

From the foregoing it will be seen that the present invention provides a extremely compact and economical configuration to provide a valving function for controlling or reducing intake manifold pressure in a turbocharged or supercharged engine. The invention utilizes a minimum number of parts with few if any critical, close-tolerance dimensions. This is particularly true due to the dual function of the diaphragm 48, i.e. it is acting both as a normal diaphragm in sealing opposing pressure chambers, and also acting as the direct valving function due to its direct engagement upon planar surface 22. While preferably the invention utilizes separate adapter and cover housings, it can be readily understood that the main compressor housing 16 and adapter housing 26 may be integrally formed such that the cover housing 36 is directly mounted to the integral compressor housing.

It will now be apparent that present invention also contemplates an improved method for modulating fluid flow from a discharge passage in the housing of a compressor of a turbocharger, supercharger or the like by a diaphragm acting not only as a seal but also as the valve itself. The method also contemplates axially retaining the diaphragm assemblage through utilization of the retainer 64 sliding within cylindrical wall 38, while also permitting transversal excursional movement between the retainer and backing piston so as to minimize close dimensional tolerances. This is all accomplished while exposing one side of the diaphragm to different actuating pressures, both high pressure and low pressure, while the opposing side of the diaphragm is exposed to a subatmospheric pressure signal which operates in conjunction with the force exerted by the biasing spring 60 to control the axial movement and axial position of the diaphragm 48 and thus control the valving function of the diaphragm.

Various alterations and modifications to the described preferred embodiment will be apparent to those skilled in the art. Accordingly, the foregoing detailed description should be considered exemplary in nature and not as limiting to the scope and spirit of the invention as set forth in the appended claims.

Having described the invention with sufficient clarity that those skilled in the art can make and use it, I claim:

1. In a turbocharger having centrifugal compressor means rotatably mounted within a compressor housing for receiving airflow through an inlet passage opening onto a planar, end face of said housing, and for discharging said airflow in a high pressure state through a discharge passage in the housing, said housing having an interconnection duct extending from said discharge passage and opening onto said end face;

an adapter housing secured to said end face of the compressor housing, said adapter housing defining an axially extending airflow inlet port aligned with and communicating with said inlet passage of the compressor housing, and an axially extending opening aligned with said interconnection duct;

a cover housing secured to said adapter housing to close said opening therein, said cover housing having a signal port adapted to communicate an external pressure signal source to the interior of said cover housing;

a flexible diaphragm having a continuous peripheral edge sealingly clamped between said adapter and cover housings, said diaphragm and adapter housing together defining a pressure signal chamber communicating with said signal port, said diaphragm operable to seal said pressure signal chamber from said inlet passage and interconnection duct of the compressor housing;

a relatively rigid backing piston disposed in said pressure signal chamber in engagement with said diaphragm; and biasing means in said pressure signal chamber reacting between said cover housing and said backing piston for urging said diaphragm into a first position in sealing engagement with said end face of the compressor housing to interrupt fluid communication between said inlet and discharge passages through said interconnection duct, said diaphragm movable away from said first position to permit fluid flow through said interconnection duct.

2. A device as set forth in claim 1, wherein said diaphragm is variably movable away from said first position in response to said external pressures to modulate fluid flow from said discharge passage through said interconnection duct to said inlet passage.

3. A device as set forth in claim 1, wherein said diaphragm is arranged with the pressure of said external pressure source and the force of said biasing means urging said diaphragm toward said first position, said diaphragm having a first, central circular area exposed to discharge pressure and a second, concentric annular area exposed to inlet pressure, said discharge and inlet pressures acting on said first and second areas to urge said diaphragm away from said first position.

4. A device as set forth in claim 3, wherein said second area is substantially larger than said first area.

5. A device as set forth in claim 1, wherein said cover housing includes an axially extending cylindrical wall, said biasing means comprising a resilient spring disposed within said cylindrical wall.

6. A device as set forth in claim 5, further including a retainer disposed between said spring and said backing piston, said retainer being axially guided within said cylindrical wall.

7. A device as set forth in claim 6, said retainer having a flat transverse end surface engaging a matingly configured surface of said backing piston, said backing piston having a upstanding rib on said matingly configured surface surrounding said end surface of the retainer to limit relative transverse excursional movement between said retainer and said backing piston.

8. A device as set forth in claim 6, further including a stop disposed between said cover housing and said spring, said stop being axially adjustable relative to said cover housing to vary the compression of said spring.

9. A device as set forth in claim 7, wherein said retainer is directly axially aligned with said interconnection duct at the latter's location of opening onto said end face of the compressor housing.

10. A device as set forth in claim 9, further including a plurality of axially extending bolts intersecuring said compressor housing, cover housing, and adapter housing.

11. A device as set forth in claim 10, further including a sealing gasket disposed between said compressor housing and said cover housing, said diaphragm operable to seal between said cover housing and said adapter housing.

12. A device as set forth in claim 11, wherein said diaphragm has an enlarged diameter bead at the peripheral edge thereof, said cover housing having a circular groove surrounding said opening in the cover housing and receiving said enlarged bead.

13. In a turbocharger having centrifugal compressor means rotatably mounted within a compressor housing for receiving airflow through an inlet passage opening onto a planar, end face of said housing, and for discharging said airflow in a high pressure state through a discharge passage in the housing, said housing having an interconnection duct extending from said discharge passage and opening onto said end face;

an adapter housing secured to said end face of the compressor housing, said adapter housing defining an axially extending airflow inlet port aligned with and communicating with said inlet passage of the compressor housing, and an axially extending opening aligned with said interconnection duct;

a cover housing secured to said adapter housing to close said opening therein, said cover housing having a signal port adapted to communicate an external pressure signal source to the interior of said cover housing;

a flexible diaphragm having a continuous peripheral edge sealingly clamped between said adapter and cover housings, said diaphragm disposed in overlying relationship with said interconnection duct; and biasing means reacting between said adapter housing and said diaphragm for urging said diaphragm into a first position in sealing engagement with said end face of the compressor housing to interrupt fluid communication between said inlet and discharge passages through said interconnection duct.

* * * * *